3,037,940
METHOD FOR FORMING LIGHTWEIGHT AGGREGATES
Francis V. Pixley and George W. Pixley, Newburgh, and Harold Lopinot, New Windsor, N.Y., assignors to Pelm Research and Development Corporation, Newburgh, N.Y., a corporation of New York
Filed Feb. 9, 1959, Ser. No. 792,002
11 Claims. (Cl. 252—378)

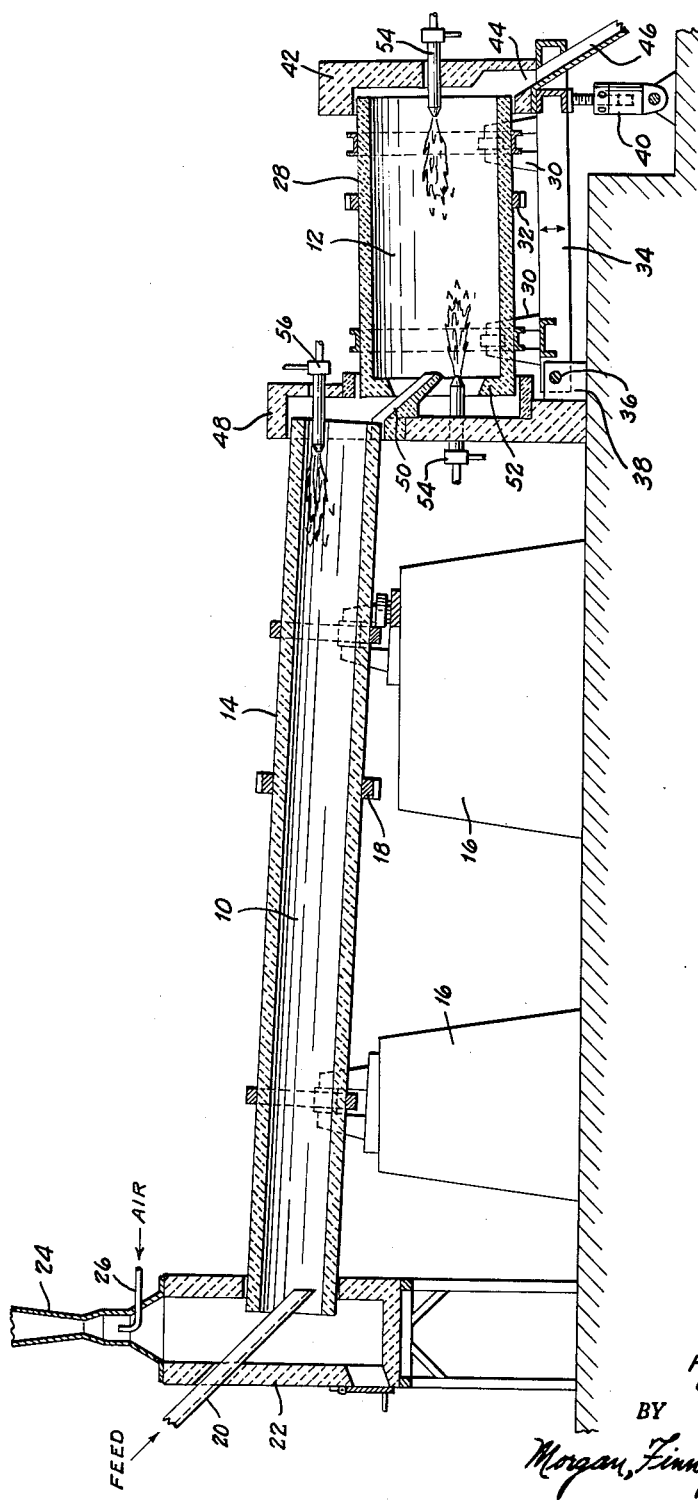

The invention relates to the formation of aggregates and more particularly to the formation of lightweight aggregates through the expansion of the raw material particles.

At the present time there are a number of methods employed in forming the aggregates used in making concrete and several of these involve the expansion, or "bloating," of the raw material particles. Of these latter methods, one of the most common is to pass the raw material particles through an inclined rotary kiln. The raw material is introduced into the kiln at the upper end thereof and during its passage through the kiln is heated by a burner at the lower, or discharge, end. In this way the raw material particles are gradually brought to the "bloating" temperature, that is, the temperature at which the surfaces of the particles are sealed and the volatile constituents in the particles sublimated.

There are associated with the above-described method several very serious disadvantages. First of all the method entails high fuel costs. This results from the fact that the method does not permit utilization of an efficient heating arrangement. The single burner located at the lower, discharge end of the kiln can efficiently heat only a very small portion of the kiln. Furthermore, the relatively short "bloating" zone limits the amount of raw material that can be processed due to the necessity of retaining each particle in the "bloating" zone long enough to properly expand the particle. Accordingly, the amount of raw material in the kiln is not sufficient to efficiently absorb the heat and most of the heat passes out the exhaust.

Another disadvantage of the method is that only raw material particles of substantially the same size can be processed at one time. The reason for this is that the retention time in the "bloating" zone must be set to completely "bloat" the larger particles. Smaller particles, which require less time to "bloat" and which actually take longer to pass through the kiln, thus receive too much heat and fuse around the larger particles. To produce the required particle size in the finished product such "klinkers" must be ground. Apart from the added expense resulting from this additional operation the grinding also has the effect of producing a less desirable open-pored aggregate.

In addition to the above-discussed disadvantages, the method fails to provide sufficient heat control to produce a uniform, properly bloated product. As has been pointed out the single burner at the discharge end gives a proper temperature control for only a very short distance. Further extension of the burner's effect into the kiln can only be obtained by raising the temperature adjacent the burner above that required for proper "bloating." The net result is that the particles of raw material are each gradually brought up to the "bloating" temperature instead of being quickly brought to the "bloating" temperature which is much preferred.

Furthermore, the limitations of the heating arrangement impose severe limitations on the amount of production which can be obtained from the method. Since the "bloating" zone is very short and the gradual heating of the particles requires a longer period of "soaking" than would otherwise be necessary the particle retention time in the "bloating" area is such that the feed of the material through the kiln is necessarily fixed. Too fast a feed will give too short a retention time and too slow a feed will give too long a retention time. This fixed rate of feed, which must be low because of the shortness of the "bloating" zone, coupled with the low loading percentage of the kiln, results in low production from the kiln.

Our invention has, among its objects, the development of a novel method which would constitute an improvement over the method and apparatus above-described, in that, the disadvantages connected therewith would be obviated or greatly lessened.

More specifically our invention has for an object the development of a new and improved method of expanding raw material which would be more economical, yield a better, more uniform product, provide a greater degree of control over the heating of the particles and give greater flexibility in the retention time of the particles in the "bloating" zone and in the size of the particles treated in the process than the methods heretofore employed in rotary kilns.

Briefly, and in general, our improved method, unlike that above-described, contemplates the simultaneous processing of raw material particles of varying size and in passing the particles through a kiln in a manner such that each particle remains within the "bloating" zone for a period of time substantially in proportion to its size and weight, i.e. its density. Furthermore, the heating of the particles is carried out in such a way that the length of the "bloating" zone is increased and the individual particles of raw material are rapidly brought to the proper temperature rather than gradually as heretofore.

More precisely, the particles of raw material are first pre-heated to drive off the moisture therein and to prepare the particles for "bloating." Thereafter the particles are introduced directly into the "bloating" zone where the relatively large temperature differential between the particles and the "bloating" zone quickly transforms the outside skin of the particles into an elastic impervious state before the volatile constituents of the particles have been sublimated. Exposure of the particles to the temperature of the "bloating" zone is continued for a period of time substantially in accordance with the size and weight of the particles so that each particle is expanded substantially to the same degree.

In the preferred manner of practicing our invention the particles are introduced into the "bloating" zone with the desired temperature differential by effecting the pre-heating step in a chamber separate from that in which the "bloating" is accomplished. Each particle is retained within the "bloating" zone for the proper period in accordance with its size and weight by variably inhibiting the passage of the particles through the expansion chamber. The latter step may, of course, be carried out in many ways. We have found that a simple and very satisfying method is to agitate the raw material particles so as to set them into continuous random motion and simultaneously pass the particles upwardly in an inclined path through the "bloating" zone. This combined action appears to effect a continuous classification of the particles in a downward and rearwardly direction in which the larger and heavier particles always tend to assume a position farther downwardly and backwardly than the lighter and smaller particles. The total movement of the mass of raw material, however, is forwardly and upwardly due to the continual feed of more raw material particles into the kiln, which particles serve to limit the extent of possible backward movement of preceding particles. At any rate, we have found that the net result is to retain the particles in the "bloating" zone substantially in proportion to their size and weight, the smaller and lighter particles passing through more quickly than the larger and heavier particles. Since the smaller and lighter particles do not require as long a retention time as the larger and heavier particles to effect complete expansion all particles are expanded to substantially the same degree thereby obtaining a highly uniform product.

Our apparatus for carrying out the method comprises, in general, a heating chamber to receive the raw material particles, means for passing the raw material particles through the heating chamber, and means for variably inhibiting the passage of the particles through the heating chamber. Preferably, the apparatus has a separate pre-heating chamber from which the material is directly introduced into the heating chamber. The preferred form of the variable inhibiting means comprises means for agitating the particles into a continuous random motion and for simultaneously passing the particles along an upwardly inclined path through the heating chamber.

It will be understood that the foregoing general description and the following detailed description as well are exemplary and explanatory of the invention but are not restrictive thereof.

The drawing is a longitudinal section taken along the center line of applicants' preferred form of apparatus for carrying out the method.

As shown in the drawing, our preferred form of apparatus comprises a two-stage construction so as to provide a pre-heating chamber 10 separate and distinct from the heating chamber 12 in which the "bloating" of the particles takes place. The pre-heating chamber 10 is formed by an open-ended, cylindrical rotary kiln 14 rotatably supported on the foundation blocks 16 with a downward inclination from left to right as viewed in the drawing. As is customary in the art, the kiln 14 is provided with a large gear 18 about its periphery which cooperates with suitable driving mechanism (not shown) to effect rotation of the kiln.

Raw material particles are fed into the upper end of the pre-heating kiln 14 through a stationary chute 20 from a suitable source of supply (not shown). The chute 20 is mounted within an exhaust chamber 22 having a venturi-shaped exhaust stack 24 at its upper end. Compressed air is exhausted through the throat of the venturi 24 by means of the conduit 26 so as to form, in effect, a jet jump that draws the exhaust gases out of the kilns 14, 28.

The second-stage kiln 28, forming the "bloating" chamber 12, likewise comprising an open-ended, cylindrical rotary kiln rotatably mounted on the supports 30 and provided with a large gear 32 about its periphery which, in cooperation with the usual driving mechanism (not shown), effects the rotation of the kiln. The inclination of the kiln 28 is opposite to that of the kiln 14 in that the left hand, or inlet end, of the kiln 28 as viewed in the drawing, is lower than the right hand, or discharge end. Control over the angle of inclination is provided by mounting the supports 30 for the kiln 28 on a frame 34 pivotable about the rod 36 in the stationary brackets 38. Adjustment of the angle is made by raising or lowering a jack 40 placed beneath the opposite, or free end, of the frame 34.

Both kilns 14, 28 are lined with refractory material of sufficient thickness to conserve heat and resist the abrasion of the particles. In addition, a wall of refractory material 42 is erected on the frame 34 to close off the discharge end of the kiln 28 leaving, however, an opening 44 through which the particles may be discharged down the chute 46. A wall of refractory material 48 is also provided between the kilns 14, 28. Because the longitudinal axes of the two kilns are offset from each other the inlet end of the "bloating" kiln 28 lies almost wholly below the discharge end of the pre-heating kiln 14. The wall 48 thus serves to close off the ends of the kilns 14, 28 which would otherwise remain open thereby preventing escape of the heated air at these points and also serving to direct the exhaust heat from the "bloating" kiln 28 to the pre-heating kiln 14. A spillway 50 of refractory material is mounted on the wall 48 and serves to direct the discharge from the kiln 14 to the kiln 28.

The "bloating" kiln is provided at its lower, or inlet end, with a dam 52 partially restricting the open diameter of the kiln 28 at that point. Inasmuch as the purpose of the dam is to prevent the escape of the raw material particles from the kiln which would otherwise happen because of the reverse inclination of the kiln 28, the height of the dam is made great enough to always be higher than the level of the discharge end of the kiln regardless of the kiln's angle of inclination.

The "bloating" kiln 28 is heated substantially uniformly throughout its entire length by means of oil burners 54 located at both the discharge and inlet ends while the pre-heating kiln 14 is heated by the exhaust gases from the kiln 28. In the drawing an additional burner 56 is shown firing into the pre-heating kiln 14 but this burner is optional.

Each kiln is properly dimensioned to carry out the function assigned to it. The "bloating" kiln 28 is made with a relatively large diameter and short length. The proportions of the kiln are selected so as to expose the greatest amount of raw material to the flame of the burners 54 and the radiated heat of the chamber 12 in accordance with the required retention time to give complete expansion. In this way the greatest production of material per unit of time is obtained. In the case of the pre-heating kiln 14 the proportions are selected to give a length of travel great enough to satisfactorily absorb the exhaust heat passing through the kiln and a diameter such that the loading of raw material is great enough to hinder the drift of the exhaust heat. The length to diameter ratio is set at the most economical ratio between the two.

In practice, the above described apparatus is utilized to carry out our preferred method as follows: The particles of raw material of various sizes are introduced into the pre-heating kiln 14 through the stationary chute 20. After being introduced into the kiln the particles pass downwardly through the kiln as a result of the rotation thereof and the rate of feed of the particles through the kiln is governed by the speed of rotation and inclination of the kiln. If desired, lifters may be provided in the pre-heating kiln 14 to help spill the material through the path of the exhaust gases. Due to the small diameter and the relatively great length of the kiln and the loading of the raw material particles in the kiln, each of the particles is thoroughly pre-heated by the escaping exhaust heat from the "bloating" kiln 28 by the time it reaches the spillway 50 and has had all of its moisture driven off.

The particles fall directly from the discharge end of the pre-heating kiln 14, down the spillway 50 into the lower inlet end of the "bloating" kiln 28. As the particles of raw material continue to fill up the "bloating" chamber 12 there is formed in the bottom of the kiln 28 a bed of pre-heated raw material particles extending from the dam 52 to the discharge end of the kiln. The bed is deepest at a point immediately adjacent the dam 52 and gradually tapers to a very thin depth at the discharge end of the kiln 28.

When the particles drop into the kiln 28 they are at a relatively low temperature while the temperature of the "bloating" chamber 12 is very much higher. As a result of the very large temperature differential there is a very rapid heating of the particles to a point where the outer surfaces of the particles become elastic and impervious before the volatile constituents can be sublimated. Thereafter, as the particles pass through the chamber 12 the volatile constituents are sublimated thus causing the expansion or "bloating" of the particles.

The passage of the particles through the kiln 28 is effected despite the inclination of the kiln toward the inlet end. Rotation of the kiln 28 causes the particles to climb up the sides of the kiln until gravity causes them to fall back down to the bottom of the kiln. Since the heavier and larger particles fall back before the lighter and smaller particles, the entire action is, in effect, a tumbling action in which all of the particles are continuously raised to various heights and then permitted to fall back upon other particles. The net effect is to set the bed of raw material particles into continuous random motion and to effect a continuous classification of the particles.

The reverse inclination of the kiln 28 appears to cause the particles falling from the sides of the kiln to try to move as far back in the kiln as is possible. Since the larger particles fall from the sides of the kiln before the lighter particles these larger particles can fall farther than the smaller particles because by the time the smaller particles have fallen the larger ones have preceded them and have preempted the available space. Thus, there is a continual classification in which the bed of particles is taken up along the sides of the kiln and allowed to fall back with the larger and heavier particles falling first and tending to go back toward the inlet end. The smaller particles, because they are the last to fall are always forced to take a position closest to the discharge end. Since additional particles are continually being fed into the kiln through the spillway 50, all of the particles are gradually forced out the discharge end because the original space occupied by the particles is taken up by incoming particles while the preceding particles are being carried up the sides of the kiln. However, the smaller particles are forced through the kiln more quickly than the larger, heavier particles because of the tendency of larger and heavier particles to fall off the wall before the lighter particles and to roll farther back toward the inlet.

It will thus be seen that, unlike the pre-heating kiln 14 in which the rate of feed of material therethrough depends on the speed of rotation of the kiln, the rate of feed in the "bloating" kiln 28 depends only on the rate at which the raw material is being introduced into the kiln. The speed of rotation of the kiln 28, therefore, can be set to give the best tumbling action to the particles.

The angle of inclination of the kiln 28 is set to give the proper retention time in the "bloating" zone for the material being processed. It will be appreciated that the retention time in the kiln is governed by the amount of time it takes to build up a bed in the bottom of the "bloating" chamber 12. Once the bed has been built up, the discharge from the kiln is identical with that of the input. Accordingly, if it is desired to change the retention time of the particles in the bloating" zone the inclination is increased. This gives a deeper bed and hence a longer build up or retention time. For a shorter period the inclination is lessened.

It will be readily appreciated by those in the art that our method may be carried out with apparatus different from the preferred apparatus shown and described herein. Accordingly, it is to be understood that we do not mean to be limited to the preferred form of the invention shown and described but only to that defined in the appended claims.

What is claimed is:

1. A method for producing lightweight aggregates which comprises introducing expandable particles into a heating zone, agitating the particles into continuous random motion, supplying heat to the zone and concurrently passing the particles through said zone, said zone being inclined at an angle such that the passage of said particles through the zone is upward, forcing the lighter and smaller particles upward along the inclined zone by displacement with the heavier and larger particles so that the lighter and smaller particles are forced upwardly at a greater rate than the heavier and larger particles.

2. A method, as set forth in claim 1, which includes rotating said heating zone.

3. A method for producing lightweight aggregates comprising the steps of, feeding expandable particles into a heated inclined zone, said zone inclined upward from the entry end thereof to the exit end, maintaining a bed of particles in said zone against the force of gravity, agitating said particles within said zone, and forcing the lighter and smaller particles upward within said inclined zone and out the exit end by displacement of said lighter and smaller particles from the particle bed by the heavier and larger particles, whereby the residence period of the particles is substantially directly proportional to their size and weight at a given particle feed rate.

4. A method for producing lightweight aggregates as defined in claim 3 including the additional step of varying the residence period of said particles in said zone by changing the inclination angle of said zone.

5. A method for producing lightweight aggregates comprising the steps of, feeding expandable particles into a heated rotating inclined zone, said zone inclined upward from the entry end thereof to the exit end, maintaining a bed of particles in said rotating zone against the force of gravity, tumbling said particles within said zone by the rotation thereof, and forcing the lighter and smaller particles upward within said inclined zone and out the exit end by displacement of said lighter and smaller particles from the particle bed by the heavier and larger particles, whereby the residence period of the particles is substantially directly proportional to their size and weight at a given particle feed rate.

6. A method for producing lightweight aggregates comprising, feeding expandable particles into a heated rotating inclined cylinder, said cylinder inclined upward from said entry end with respect to a horizontal line, said cylinder having a reduced diameter wall at the entry end thereof for maintaining a particle bed against the force of gravity, tumbling said particles within said cylinder by the rotation thereof, and forcing the lighter and smaller particles upward and out the open end by displacement of said particles from the particle bed by the heavier and larger particles, whereby the residence period of the particles is substantially directly proportional to their size and weight at a given particle feed rate.

7. A method for producing lightweight aggregates comprising the steps of, passing expandable particles through a downwardly inclined rotating heating zone, transferring said particles into a heated bloating zone, said bloating zone inclined upward from the entry end thereof to the exit end, maintaining a bed of particles within said bloating zone, agitating said particles within said bloating zone, and forcing the lighter and smaller particles upward within said inclined zone and out the exit end by displacement of said lighter and smaller particles from the particle bed by the heavier and larger particles, whereby the residence period of the particles is substantially directly proportional to their size and weight at a given particle feed rate.

8. A method for producing lightweight aggregates as defined in claim 7 including the additional step of varying the residence period of said particles in said bloating zone by changing the inclination angle of said zone.

9. The method of passing expandable particles through an upwardly inclined rotating heated chamber and uniformly expanding said particles during passage comprising feeding said particles into the lower end of said chamber, and forcing the expanded particles out the upper end of the chamber by displacing said expanded particles with the non-expanded greater density particles, whereby the period of passage of said particles varies substantially directly with their density.

10. A method for producing lightweight aggregates comprising the steps of, feeding expandable particles into a heated inclined zone, said zone inclined upward from the entry end thereof to the exit end, maintaining a bed of particles in said zone against the force of gravity, agitating said particles within said zone, forcing the lighter and smaller particles upward within said inclined zone and out the exit end by displacement of said lighter and smaller particles from the particle bed by the heavier and larger particles, and varying the rate of particle displacement by controlling the feeding rate of particles into said zone, whereby the residence period of the particles is substantially directly proportional to their size and weight at a given inclination angle of said zone.

11. A method for producing lightweight aggregates comprising the steps of, passing expandable particles through a downwardly inclined rotating heating zone, transferring said particles into a heated bloating zone, said bloating zone inclined uniformly upward from the entry end thereof to the exit end, maintaining a bed of particles within said bloating zone, agitating said particles within said bloating zone, forcing the lighter and smaller particles upward within said bloating zone and out the exit end by displacement of said lighter and smaller particles from the particle bed by the heavier and larger particles, and varying the rate of particle displacement by controlling the feeding rate of the particles into said zone, whereby the residence period of the particles is substantially directly proportional to their size and weight at a given inclination angle of said bloating zone.

References Cited in the file of this patent

UNITED STATES PATENTS

| | | |
|---|---|---|
| 1,860,475 | Pine | May 31, 1932 |
| 1,877,138 | Lee et al. | Sept. 13, 1932 |
| 1,882,052 | Wyatt | Oct. 11, 1932 |
| 2,456,207 | McCoy | Dec. 14, 1948 |
| 2,505,249 | Johnson et al. | Apr. 25, 1950 |
| 2,572,484 | Howle et al. | Oct. 23, 1951 |
| 2,590,090 | DeVaney | Mar. 25, 1952 |
| 2,639,269 | Dube | May 19, 1953 |
| 2,642,273 | Dube | June 16, 1953 |
| 2,694,565 | Sainderichin | Nov. 16, 1954 |